(12) United States Patent
Adachi (10) Patent No.: US 7,075,862 B2
(45) Date of Patent: Jul. 11, 2006

(54) RECORDING APPARATUS FOR OPTICAL RECORDING MEDIUM

(75) Inventor: Masatoshi Adachi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 731 days.

(21) Appl. No.: 10/098,619

(22) Filed: Mar. 18, 2002

(65) Prior Publication Data

US 2002/0154585 A1    Oct. 24, 2002

(30) Foreign Application Priority Data

Mar. 19, 2001  (JP)  ............................. 2001-077723
Jan. 29, 2002  (JP)  ............................. 2002-020087
Mar. 12, 2002  (JP)  ............................. 2002-066882

(51) Int. Cl.
G11B 21/08  (2006.01)

(52) U.S. Cl. ................................. 369/30.11; 369/30.12

(58) Field of Classification Search ............... 369/47.3, 369/47.31, 53.29, 30.11, 30.12, 47.28
See application file for complete search history.

(56) References Cited

U.S. PATENT DOCUMENTS 5,835,461 A * 11/1998 Kobayashi et al. ...... 369/47.28
6,192,013 B1 * 2/2001 Kimura et al. ........... 369/47.31
6,252,838 B1 * 6/2001 Kuroda et al. ........... 369/47.28
6,473,375 B1 * 10/2002 Aramaki ................... 369/47.13
6,643,231 B1 * 11/2003 Ono et al. ................ 369/44.28
6,693,862 B1 * 2/2004 Shigemori ............... 369/47.31
6,707,776 B1 * 3/2004 Nagata et al. ........... 369/59.25
6,724,704 B1 * 4/2004 Kuroda .................... 369/47.28
6,735,155 B1 * 5/2004 Kuroda et al. ........... 369/47.27
2002/0101803 A1 * 8/2002 Hayashi et al. ............ 369/47.3
2002/0122357 A1 * 9/2002 Negishi .................... 369/30.11

FOREIGN PATENT DOCUMENTS

| EP | 0 991 061 A | 4/2000 |
| EP | 1 022 735 A2 | 7/2000 |
| WO | WO 98/22946 | 5/1998 |

* cited by examiner

Primary Examiner—Wayne Young
Assistant Examiner—Adam R. Giesy
(74) Attorney, Agent, or Firm—Drinker Biddle & Reath LLP (57) ABSTRACT

A recording apparatus for a write-once and/or re-recordable optical recording medium includes a discriminator for discriminating a recording position information from the optical recording medium; a detector for detecting a deviation between the address information recorded in the recording medium and the recording position information; and a controller for controlling the recording position of a data signal including address information based on the deviation while recording the data signal.

4 Claims, 8 Drawing Sheets

RECORDING APPARATUS FOR OPTICAL RECORDING MEDIUM

BACKGROUND OF THE INVENTION

1. Field of the Invention

The present invention relates to a recording apparatus for an optical recording medium.

2. Description of the Related Art

At present, an optical recording medium having a recording capacity of several gigabytes is in practical use such as a DVD-R (Digital Versatile Disc-Recordable). Development is pursued for a higher performance optical medium such as a rewritable DVD-RW (DVD-Re-recordable). The remarkable improvement of the performance of the mass storage digital optical recording medium and the reproducing apparatus has made it possible to record a large amount of data with a high quality.

On an optical disc as described above, there are formed a groove track serving as a recording track for information data, and a land track as a guide track for guiding a laser beam as a reproducing light beam or a recording light beam to the groove track. A land prepit (also simply referred to as a prepit) corresponding to pre-information (pre-recording information) is formed on the land track. The prepit bears the pre-information, which is used by an information recording and reproducing apparatus during recording and/or reproduction of data, namely, address and synchronization information used to recognize a location on the groove track. The prepit is formed beforehand prior to the shipment of the optical disc.

The groove track is wobbled at a frequency corresponding to the rotational speed of a disc. Like the prepit, the wobbled groove track is formed beforehand prior to the shipment of the optical disc.

When information data to be recorded (hereinafter simply referred to as information data or data) is recorded on the optical disc, the information recording apparatus extracts the wobble frequency of the groove track, thereby controlling the optical disc at a predetermined rotational speed. The information recording apparatus also detects the prepit, thereby acquiring the prepit information. Address information indicating a location on the optical disc is thus obtained. Based on the address information, the information data is recorded on a recording position.

A light beam is directed to the optical disc with the axis of the light beam aligned with the center of the groove track during the recording of the information data. Information pits are thus formed on the groove track in accordance with the information data. The information data is thus recorded. The light beam partly irradiates the land track, and a portion of light is reflected from the land track. The pre-information is acquired in the reflected light beam from the prepit using, for example, a push-pull method. A wobble signal is extracted from the beam reflected from the groove track, and a recording clock signal in synchronization with the rotation of the disc is thus obtained. The information data recorded on the optical disc is split every sync frame (hereinafter simply referred to as a frame) with each split data becoming a unit of information. Each sync frame contains synchronization information at the head end position thereof to maintain synchronization every sync frame.

There is a possibility that the information data (e.g., the synchronization information and the address information) is deviated in position from the originally intended synchronization position thereof with respect to the position of the prepit because of external disturbances when the information data is recorded. For example, when the information data is recorded to a point that goes far beyond the originally intended synchronization position, the data is recorded based on the position information of the prepit, thereby partially overwriting previously recorded data. If an overwriting recording occurs, the DVD-R disc is subject to an error in which both previously recorded data (old data) and currently recorded data (new data) cannot be read. In a case of the DVD-RW disc, new data can be read while the old data is destroyed.

Furthermore, a deviation of the recording position causes an unrecorded portion between the recording position of the old data (the tail or end position thereof) and the recording position of the new data (the head position thereof). If such an unrecorded portion occurs, no correct servo signal is obtained from a reproducing apparatus, and a tracing failure could take place. If an overwritten portion or an unrecorded portion takes place, no consistency is maintained between sync information position intervals, and data could be recognized as a faulty block during reproduction.

OBJECT AND SUMMARY OF THE INVENTION

The present invention has been developed in view of the above problem, and it is an object of the present invention to provide a high performance recording apparatus for a optical recording medium in which recording can be performed in a deviation free manner or recording position deviation can be minimized.

To achieve the object, according to one aspect of the present invention, there is provided a recording apparatus for a write-once and/or re-recordable optical recording medium which has a recording position information section formed beforehand for bearing recording position information, and records a data signal including address information in accordance with the recording position information, the recording apparatus comprises a discriminator for discriminating the recording position information; a detector for detecting a deviation between the address information recorded in the optical recording medium and the recording position information; and a controller for controlling the recording position of the data signal based on the deviation while recording the data signal.

According to another aspect of the present invention, there is provided a recording apparatus for a write-once and/or re-recordable optical recording medium which has a recording position information section formed beforehand for bearing recording position information, and records a data signal in a recording format including synchronization information in accordance with the recording position information, the recording apparatus comprises a discriminator for discriminating the recording position information; a detector for detecting a deviation between the synchronization information recorded in the optical recording medium and the recording position information; and a controller for controlling the recording position of the data signal based on the deviation while recording the data signal.

According to another aspect of the present invention, there is provided a recording apparatus for a write-once and/or re-recordable optical recording medium which has a recording position information section formed beforehand for bearing recording position information, and records a data signal such that the data signal has a predetermined relationship with the recording position information, the recording apparatus comprises a discriminator for discriminating the recording position information; a detector for detecting a deviation between the data signal recorded in the optical recording medium and the recording position information; and a controller for controlling the recording position of the data signal based on the deviation while recording the data signal.

DETAILED DESCRIPTION OF THE EMBODIMENTS

The embodiments of the present invention are discussed below referring to the drawings.

First Embodiment

Figure 1:
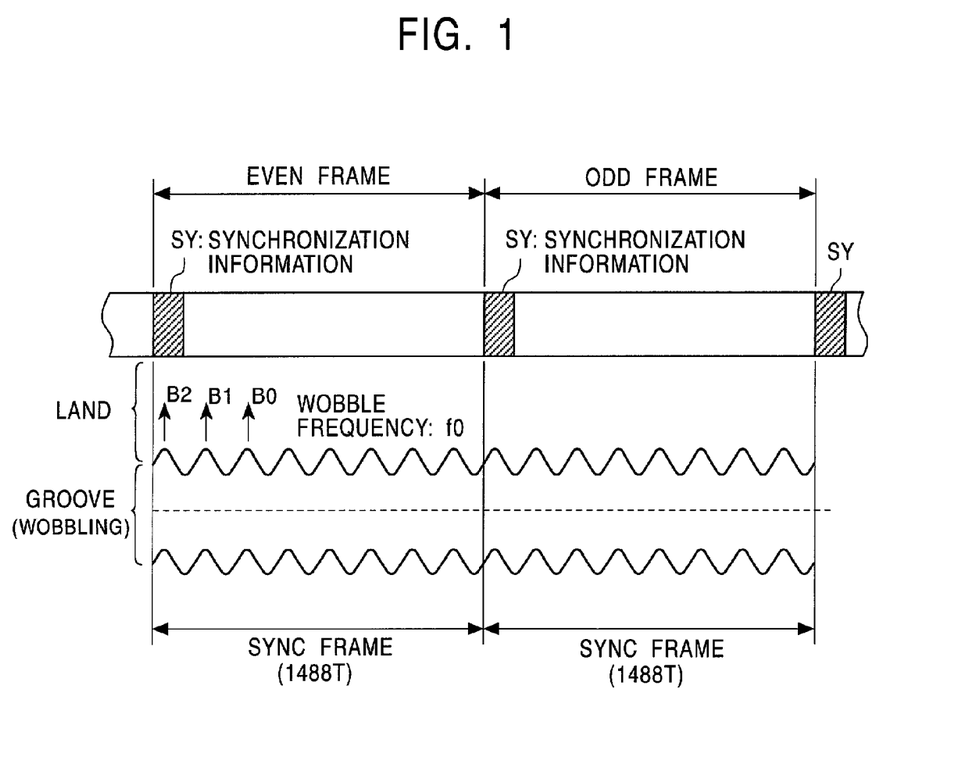
FIG. 1 diagrammatically illustrates a recording format of pre-information formed beforehand in an optical disc.

FIG. 1 illustrates a recording format of pre-information formed beforehand in an optical disc such as a write-once DVD-R disc or a DVD-RW disc. Referring to FIG. 1 (the plan view of groove track), the top portion represents a recording format in information data, and bottom two waveforms represent wobbling configurations of a groove track for recording the information data. The upwardly directed arrows between the recording format and the wobbling groove track indicate the positions of prepits. The wobbling configuration of the groove track has an amplitude much more exaggerated than an actual one for clarification. The information data is recorded along the centerline of the groove track.

The data recorded on the optical disc is split into a sync frame as an information unit. For example, one recording sector is composed 26 sync frames, and one ECC (Error Correction Code) block is composed of 16 recording sectors. One sync frame has a length 1488 times the pit interval T that is defined by the recording format when the information data is recorded (i.e., 1488T). A head portion of 32T of each sync frame is used for synchronization information SY to maintain synchronization for each sync frame.

The pre-information is recorded every sync frame on the optical disc. More specifically, a single prepit (namely, B2 in FIG. 1) is necessarily formed as a synchronization signal of the pre-information on the land track alongside an area storing the synchronization information SY in each sync frame. One or two prepits (B1 and B0) indicating the content of the pre-information to be recorded is formed on the land track adjacent to the front half portion of the sync frame other than the synchronization information SY (there are times when no prepits are formed in the first half portion of the sync frame other than the synchronization information depending on the content of the pre-information to be recorded). The prepits have a different meaning depending on the pattern of prepit sequence of B2, B1, and B0.

The prepits are typically formed in an even-numbered sync frame (hereinafter referred to as an even frame) to record pre-information. In other words, typically, no prepits are formed in an odd-numbered sync frame (odd frame) although the prepits are formed in the even frame.

It should be noted that whether the prepits are formed on the even frame or the odd frame is determined depending on the position of the preceding prepit formed on the adjacent land track of the current prepits. Specifically, the prepits are typically formed on the even frame. When the prepits are formed in the even frame, the prepits formed on the adjacent land track ahead of the current prepits are close to the current prepits in the radial direction of the optical disc, the current prepits are thus formed on the odd frame. In this arrangement, no prepits are present on adjacent land tracks, and the effect of crosstalk is reduced in the detection of the prepits.

The groove track is wobbled over all sync frames at a wobble frequency of f0, e.g., 145 kHz (frequency obtained by inserting a signal of eight wobbling cycles in a single sync frame). The information recording apparatus detects the constant wobble frequency of f0, thereby detecting a signal for controlling the rotation of a spindle motor of the optical disc. A recording clock signal is also generated.

Figure 2:
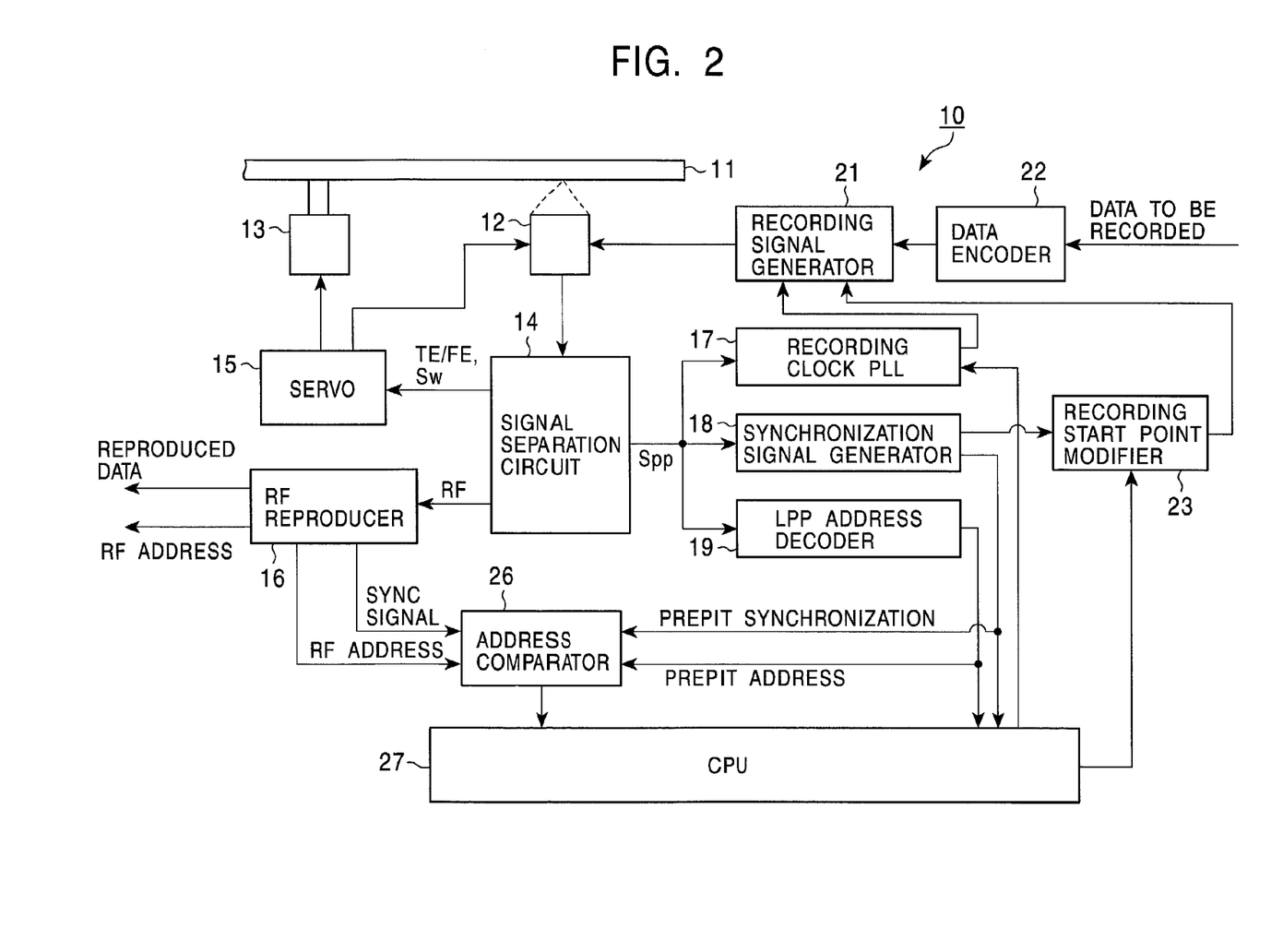
FIG. 2 is a block diagram illustrating the configuration of an optical recording apparatus in accordance with a first embodiment of the present invention.

FIG. 2 is a block diagram showing the configuration of an optical recording apparatus 10 in accordance with a first embodiment of the present invention.

A laser light beam emitted from a laser diode (not shown) as a light source installed in an optical pickup 12 irradiates an optical disc 11, such as a DVD-R disc or a DVD-RW disc. The laser light beam reflected from the optical disc 11 is detected by a photodetector (not shown) mounted in the optical pickup 12, and the detected signal is then sent to a signal separation circuit 14. A tracking error signal, focus error signals (TE and FE), and a wobble signal (Sw) obtained in the signal separation circuit 14 are supplied to a servo circuit 15. In response to these signals, the servo circuit 15 performs tracking servo control and focus servo control, while controlling a spindle motor 13 for rotating the optical disc.

An RF signal obtained in the signal separation circuit 14 is supplied to an RF reproducing circuit 16. The RF reproducing circuit 16 decodes the RF signal, thereby resulting in a reproduced data signal. The RF reproducing circuit 16 also detects a sync signal and an RF address signal from the RF signal. The RF address is recorded together with the information data during recording.

The signal separation circuit 14 extracts a prepit signal (an LPP signal), and supplies the signal to each of a recording clock PLL circuit 17, a prepit synchronization signal generator circuit 18, and a prepit address decoder 19. The prepit synchronization signal generator circuit 18 generates a prepit synchronization signal (Spp), and supplies the signal to a recording start point modifying circuit (hereinafter, referred to as a modifier) 23. The prepit address decoder 19 generates a signal indicating an address position on the disc in accordance with a prepit pattern. The prepit address is absolute position information represented by the prepits formed beforehand.

An address comparator 26 compares the RF address signal from the RF reproducing circuit 16 with the prepit address signal from the prepit address decoder 19, and sends the result of comparison to a controller (CPU) 27.

The address comparator 26 receives the sync signal and the prepit synchronization signal. These signals serve as a reference in the counter operation discussed later of the address comparator 26.

The CPU 27 supplies a recording clock modulation signal to the recording clock PLL circuit 17 based on the address comparison result signal, and a control signal indicating a recording start point to the recording start point modifier 23. The recording clock PLL circuit 17 generates a recording clock signal with respect to the prepit position as a reference and based on the recording clock modulation signal from the CPU 27, and then supplies the recording clock signal to a recording signal generator 21. The recording start point modifier 23 generates a recording start point modifying signal in accordance with the prepit synchronization signal (Spp) and the recording start point control signal from the CPU 27, and then supplies the recording start point modifying signal to the recording signal generator 21. The recording signal generator 21 receives encoder data from a data encoder which scrambles recording data and attaches a correction code. For example, the recording signal generator 21 performs an 8–16 modulation to generate a recording data pulse, which is then supplied to the optical pickup 12.

Figure 3:
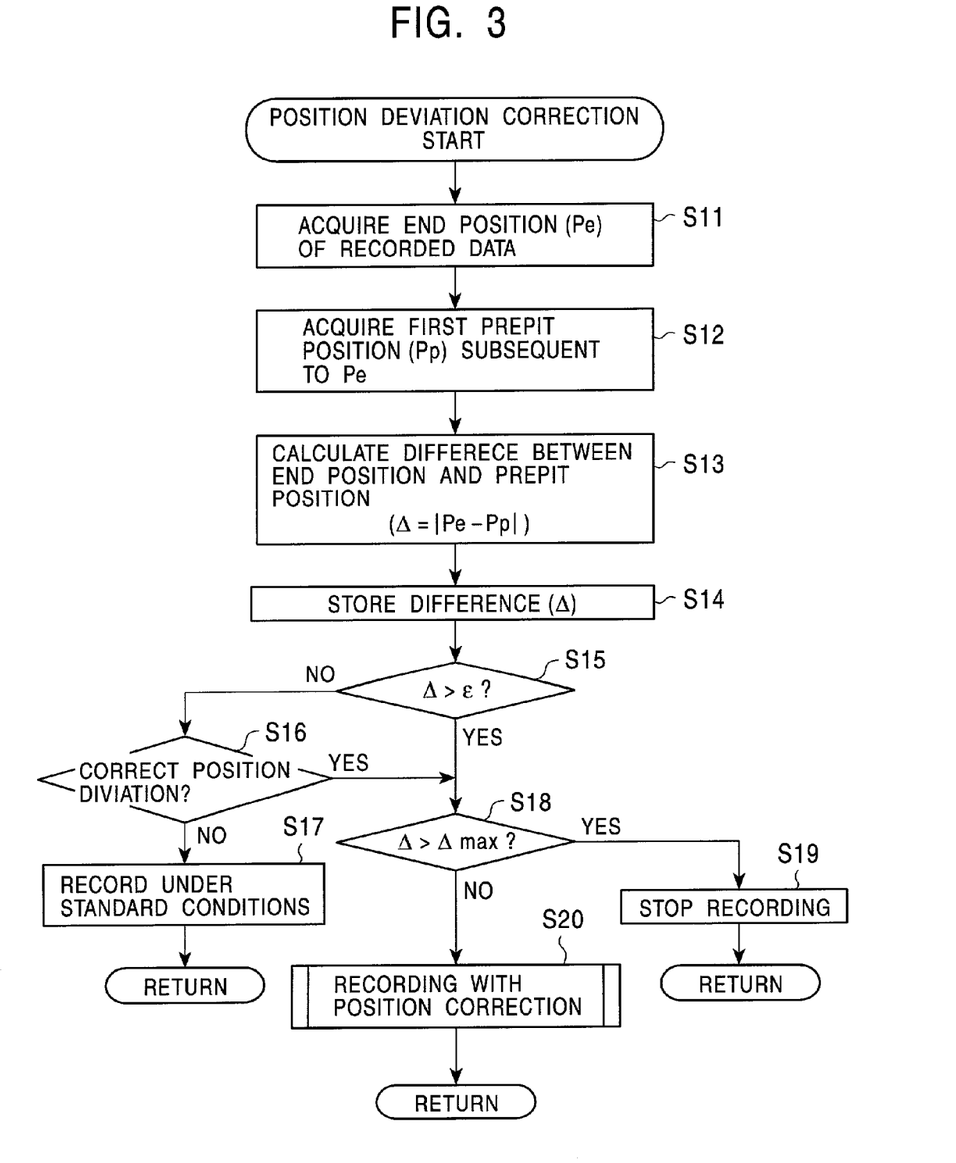
FIG. 3 is a flow diagram illustrating a recording operation procedure in the optical recording apparatus of the first embodiment of the present invention.

The recording operation procedure of the optical recording apparatus 10 thus constructed is discussed in detail referring to a flow diagram illustrated in FIG. 3. The recording operation is performed under the control of the CPU 27.

Figure 4:
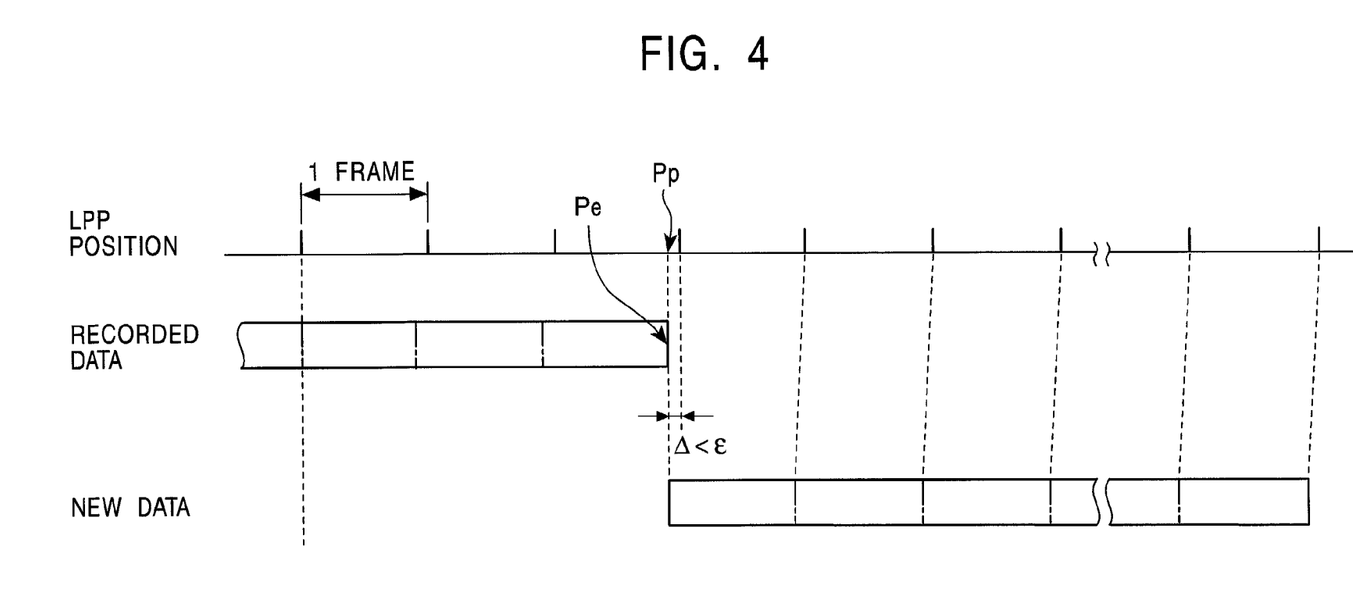
FIG. 4 illustrates the relationship between the positions of recorded data, prepit, and new data to be recorded.

The CPU 27 checks the presence or absence of an RF signal while searching for recorded data. When the RF signal is present no longer, the CPU 27 acquires an RF address (Pe) at the end position of the RF signal as shown in FIG. 4 (step S11). FIG. 4 shows the case in which a prepit is formed every sync frame. As already discussed, the prepits are formed on one of the even frame and the odd frame. For convenience of explanation, the prepits are here formed on every frame. As in step S11, the CPU 27 acquires a prepit position (Pp) from the LPP address at the moment when no RF signal is present (step S12). A difference Δ (i.e., Δ=|Pe−Pp|) between the end position of the recorded data and the prepit position is calculated (step S13), and is then stored (step S14).

The end position of the recorded data and the prepit position are determined from the above-mentioned RF address and LPP address, respectively. The deviation in this case is required to be finer than one frame. The RF address and the LPP address themselves in the DVD-R and DVD-RW formats are not given in positional resolution finer than one frame. The address comparator 26 thus operates the counters thereof to define a length in positional resolution finer than the RF address and the LPP address based on the sync signal and the LPP synchronization signal. This arrangement allows a position to be known in a unit finer than one frame. The counter for the RF sync signal and the counter for the LPP synchronization signal allow the RF address and the LPP address to be respectively represented in positional resolution finer than one frame. The difference Δ between the recording position information in the recording position information section such as the prepit and wobble and information such as the address information and the synchronization information is indicated in a unit sufficiently finer than one frame. The RF address and the LPP address in the context of this invention include the ones determined using the counters.

The CPU 27 determines whether the difference Δ exceeds a predetermined value ε (step S15). When it is determined that the difference Δ is equal to or smaller than the predetermined value ε (Δ≦ε), the CPU 27 determines whether to correct the position deviation (step S16). This determination is carried out based on predetermined conditions. For example, a position deviation may be corrected whenever there is any position deviation, may be corrected depending on the types of the recording apparatus, the disc, and data, may be corrected depending on the size of the difference Δ, or may be corrected in accordance with the setting input by the user. When the position deviation is determined not to be corrected, recording is performed under standard conditions in which no position deviation correction is executed (step S17). Referring to FIG. 4, data to be added, i.e., currently recorded data is recorded based on the position information of the prepit. As already discussed, the recording clock has the standard frequency. The predetermined value ε is appropriately determined in design. For example, the value ε may be determined to have a magnitude that causes no reproduction failure during reproduction after recording is performed under the standard conditions. When it is determined in step S16 that the position deviation is corrected, the routine proceeds to step S18.

When it is determined in step S15 that the difference Δ exceeds the predetermined value ε (Δ>ε), the CPU 27 determines whether the difference Δ exceeds the maximum predetermined value (Δmax) (step S18). When the difference Δ is larger than the predetermined maximum value (Δmax), the CPU 27 stops recording data (step S19), assuming that the recording has been ended with an abnormal state such as power interruption or that the recording itself is abnormal. The CPU 27 then returns to the main routine. The predetermined maximum value (Δmax) may be any appropriate value. It should be noted that the position deviation correction, in some instances, may be always performed with steps S18 and S19 eliminated. Alternatively, in step S19, a padding operation may be performed to record data. More specifically, an unrecorded portion extending from the end position of the recorded data (Pe) to the next prepit position is padded with predetermined data, such as invalid data of all "0's" or "1's", and the standard recording is then resumed from the next prepit position. Alternatively, the user may have an option to select between stopping the recording and the padding operation.

When it is determined in step S18 that the difference Δ does not exceed the predetermined maximum value (Δmax), the position correction and recording subroutine is called (step S20), and a position correction and recording process is performed as will be discussed later.

The RF address at the end of the recorded data is acquired from the actually read data. Alternatively, the final recording position is stored in an area for storing information to manage the recording position of the disc, for instance, in an RMA (Recording Management Area) present in a disc inner radius portion in the DVD-R disc or the DVD-RW disc. Thus, the data read from the RMA may be used.

Figure 5:
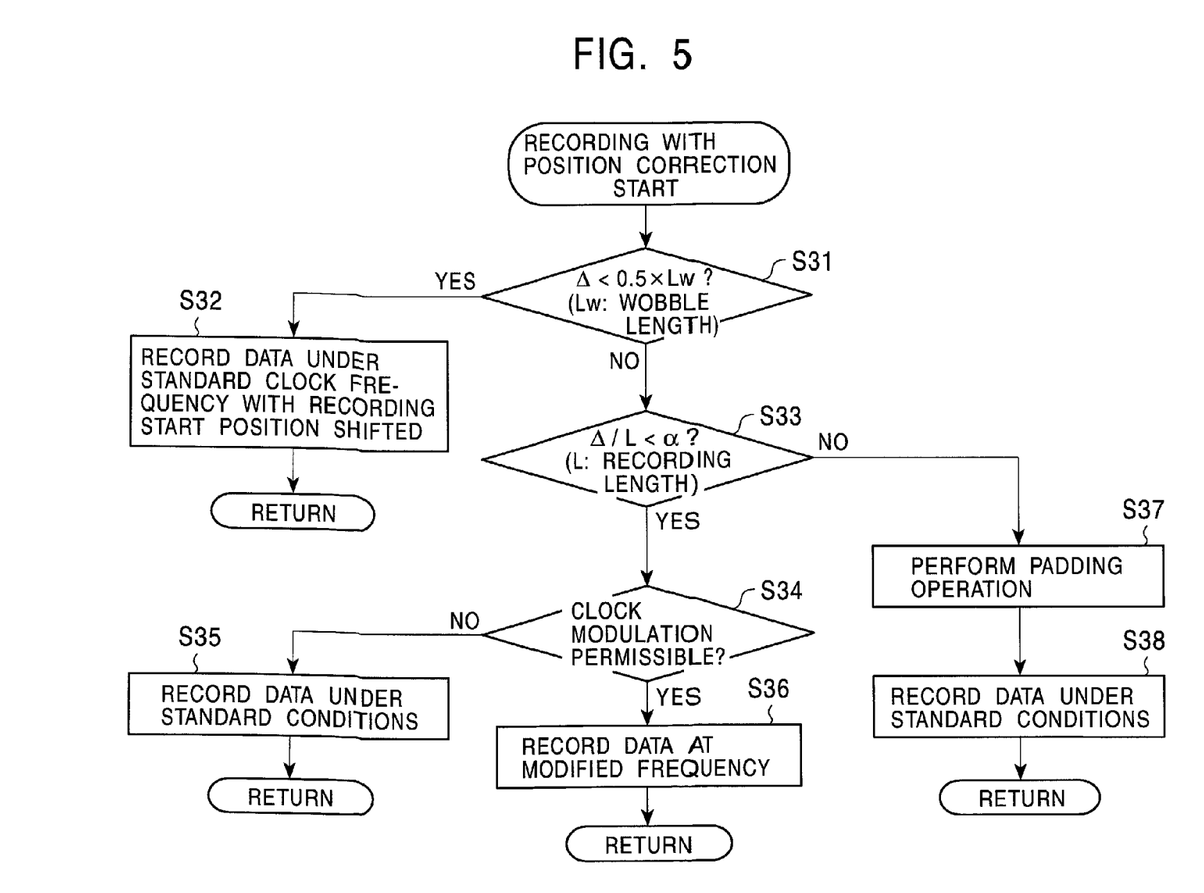
FIG. 5 is a flow diagram illustrating a recording operation procedure as one example of position correction and recording subroutines.
Figure 6:
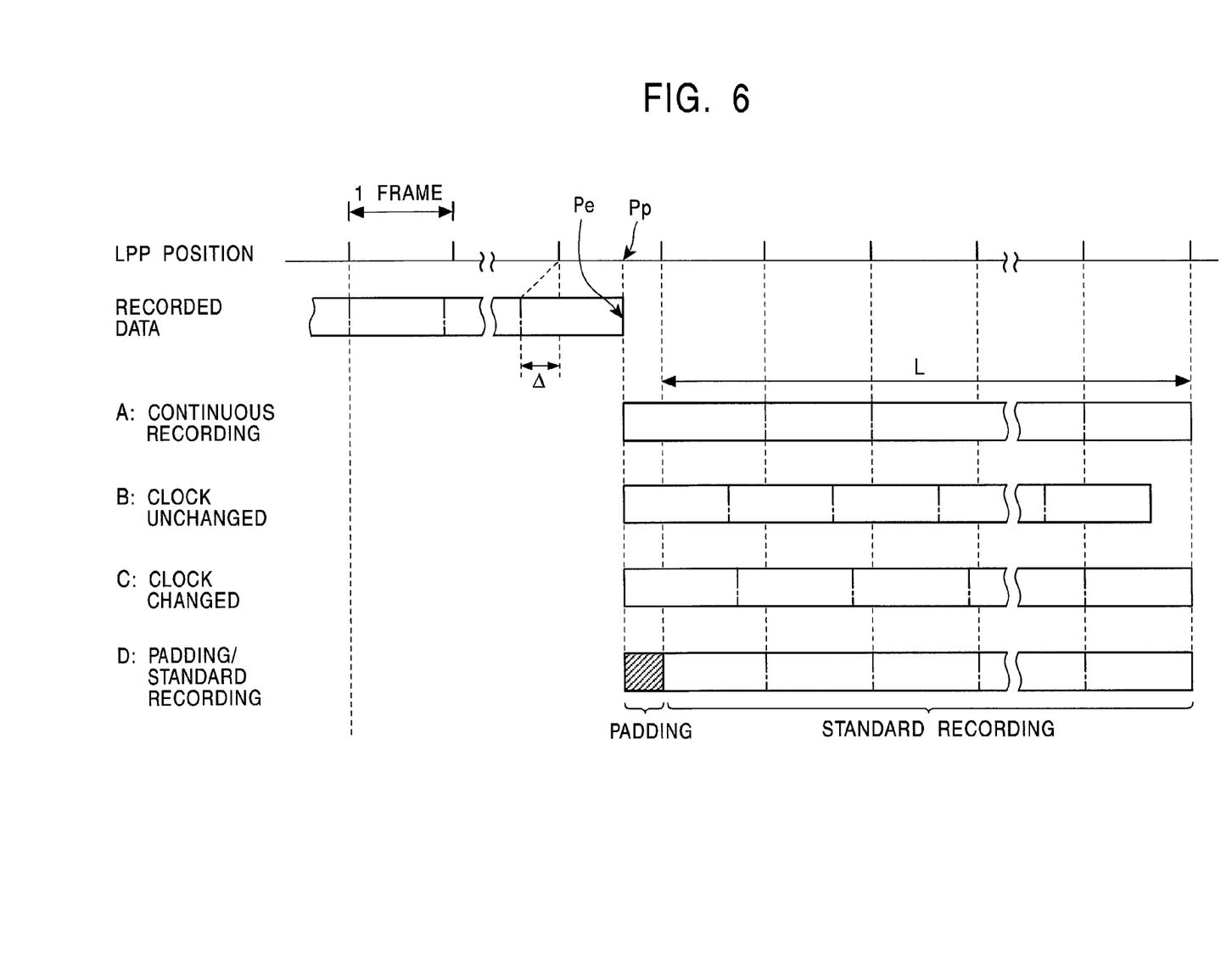
FIG. 6 illustrates the relationship of the positions of recorded data, prepit, and new data to be recorded in a variety of correction and recording modes in the position correction and recording subroutines.

The position deviation correction and recording subroutine is discussed below referring to a flow diagram in FIG. 5 and a timing diagram in FIG. 6.

The CPU 27 determines the difference Δ is shorter than half the length Lw of one period of the wobbling (i.e., wobble length) (step S31). When it is determined that the difference Δ is shorter than half the wobble length Lw, recording is performed starting subsequent to the end position of the recorded data at the standard clock frequency (step S32, in mode A shown in FIG. 6). In this case, the position deviation can be canceled out as follows. The recording start position is shifted to the end position of the recorded data and lock phase of the PLL 17 is shifted by the difference (Δ). Then, the lock phase of the PLL 17 is switched to the normal lock phase by using an actual LPP signal as the recording starts, and thus, the position deviation can be canceled out within one or several first frames.

More particularly, reproduction is carried out from a predetermined amount back from the end of the recorded data toward the end of the recorded data. Data recording is started when reached to the end of the recorded data. For example, when former recording has been performed beyond the position where recording should be, the object signal (i.e., LPP signal, in this case) for phase lock operation of the recording clock PLL 17, which is read during reproduction of the recorded data in the above-described recording operation, is delayed in advance by a time interval corresponding to the difference (Δ) to be inputted to the PLL 17 for locking the PLL 17. Then, a signal having the delay time corresponding to the difference (Δ) of zero (i.e., read LPP signal itself) is inputted to the PLL 17 when reaching around the recording start position (i.e., the end of the recorded data), for example, at the instant when reaching the recording start position. The PLL 17 operates so as to shift the lock position of recording clock to the position of the LPP signal according to the bandwidth of the PLL 17, thus, the phase deviation of the recording RF signal can be canceled out. On the contrary, when former recording has not been reached to the position where recording should be performed, the object signal (i.e., LPP signal, in this case) for phase lock operation of the recording clock PLL 17, which is delayed by a time interval corresponding to the difference of the opposite sign (i.e., −Δ), is inputted to the PLL 17 for locking the PLL 17 during reproduction of the predetermined amount of the recorded data. The similar control is performed as described above. Particularly, a signal having the delay time corresponding to the difference (Δ) of zero is inputted to the PLL 17 when reaching around the recording start position (i.e., the end of the recorded data), for example, at the instant when reaching the recording start position.

It should be noted that delaying the detected LPP signal by the time interval corresponding to −Δ, in other words, advancing the detected LPP signal by the time interval corresponding to Δ is essentially impossible. However, the object here is to advance the locking phase of the PLL 17 by the time interval corresponding to the difference Δ. Therefore, the object can be achieved, for example, by the following method. The PLL has a predetermined pull-in range and repeats pull-in operations with a pull-in period corresponding to the pull-in range. The LPP signal detected in a pull-in period is shifted to the position within the next pull-in period corresponding to the position which is advanced by the time interval corresponding to the difference Δ. Thus, advancing the locking phase of the PLL 17 by the time interval corresponding to the difference Δ is substantially achieved. in other words, the object can be achieved by delaying the detected LPP signal by "pull-in period−Δ" to be inputted to the PLL 17.

On the other hand, when it is determined in step S31 that the difference Δ is longer than half the wobble length Lw, the CPU 27 determines in step S33 whether the ratio of the difference Δ to the data length L of the data to be recorded (i.e., Δ/L) is less than a predetermined value α (i.e., Δ/L<α).

When the data length L is known prior to the start of the recording, control is performed as in step S33. When the data length L is not known prior to the start of the recording, the following method is possible. In step S33, the CPU 27 determines whether the recording clock can be modulated, in other words, determines whether the data is longer than a length with which modulation is controllable. Specifically, the CPU 27 varies the recording clock to determine whether the data has a data length long enough to reach the standard recording clock. For this purpose, the input data is held, a memory having a capacity storing the data length longer than a length with which modulation is controllable is provided, and the data is output to a data encoder 22 via the memory. When the data length with which the modulation of the recording clock is controllable is assured in the memory, the process proceeds to a modulation control. When the data length is not assured in the memory, the standard recording is performed.

When it is determined that the ratio Δ/L is equal to or greater than the predetermined value α, the process proceeds to step S37. This step will be discussed later. When it is determined that the ratio Δ/L is smaller than the predetermined value α, the CPU 27 further determines whether to permit the recording clock to be modulated and then recorded (step S34). In other words, the CPU 27 determines whether a reproduction failure occurs with the recording clock modulated and then recorded. The determination may be performed in accordance with the features or type of the disc or the setting input by the user. When the modulation of the recording clock is not permitted, recording starts from the end position of the recorded data with the recording clock PLL controlled in the frequency component only. Although an out-of-phase state is not resolved, a constant period recording clock is obtained (step S35, mode B in FIG. 6).

When it is determined in step S34 that the modulation of the recording clock is permitted, the recording clock in the start of the recording is set to the maximum permissible predetermined degree of modulation which is permitted in a range within which no reproduction failure takes place during reproduction. Then, the recording clock is gradually changed to the standard setting thereof. When the end position of the recorded data lags the prepit position, in other words, when the end position of the recorded data fails to reach a location where the end position should be, recording starts with the maximum permissible degree of modulation with which the recording clock interval expands, and then the recording clock interval is controlled to gradually become narrower. Conversely, when the end position of the recorded data leads, in other words, when the end position of the recorded data goes beyond the location where the end position should be, recording starts with the maximum permissible degree of modulation with which the recording clock interval is narrowed, and then the recording clock interval is controlled to gradually become wider (step S36, mode C in FIG. 6). As one example of control in step S36, a process loop is arranged in which a difference between the LPP address and the RF address is detected while the recording is performed, and the recording clock is modified depending on the magnitude of the difference. The recording clock in the beginning of the recording is set to the maximum permissible degree of modulation. Alternatively, the recording clock may be set to the one in a range within which no reproduction failure takes place during reproduction, in other words, to the one having the degree of modulation smaller than the maximum permissible degree of modulation.

Control is performed based on only the difference between the end position of the recorded data and the corresponding prepit position. More precise control is possible by referring to the clock rate of the recorded data during reproduction. More specifically, a clock is reproduced from the last frame of the recorded data. Based on the assumption that the preceding recording is performed on the acquired clock, the recording starts with that recording clock or a clock in the vicinity of the recording clock with which no failure occurs during reproduction. The recording clock is gradually varied to the maximum permissible degree of modulation in step S36, and then to the standard recording clock. If there is a large difference between the recording clock in the final frame of the recorded data and the recording clock of the maximum permissible degree of modulation, a failure in reading may occur during reproduction. Such a reading failure is avoided by this control.

When it is determined in step S33 that the value $\Delta/L$ is equal to or greater than the predetermined value $\alpha$, predetermined data, such as invalid data of all "0's" or "1's", is recorded (in a padding operation) on an unrecorded portion extending from the end position of the recorded data (Pe) to the next prepit position (step S37), and the standard recording is then resumed from the next prepit position (step S38).

In accordance with the above procedure, the position deviation is corrected and the recording operation is performed.

Second Embodiment

Figure 7:
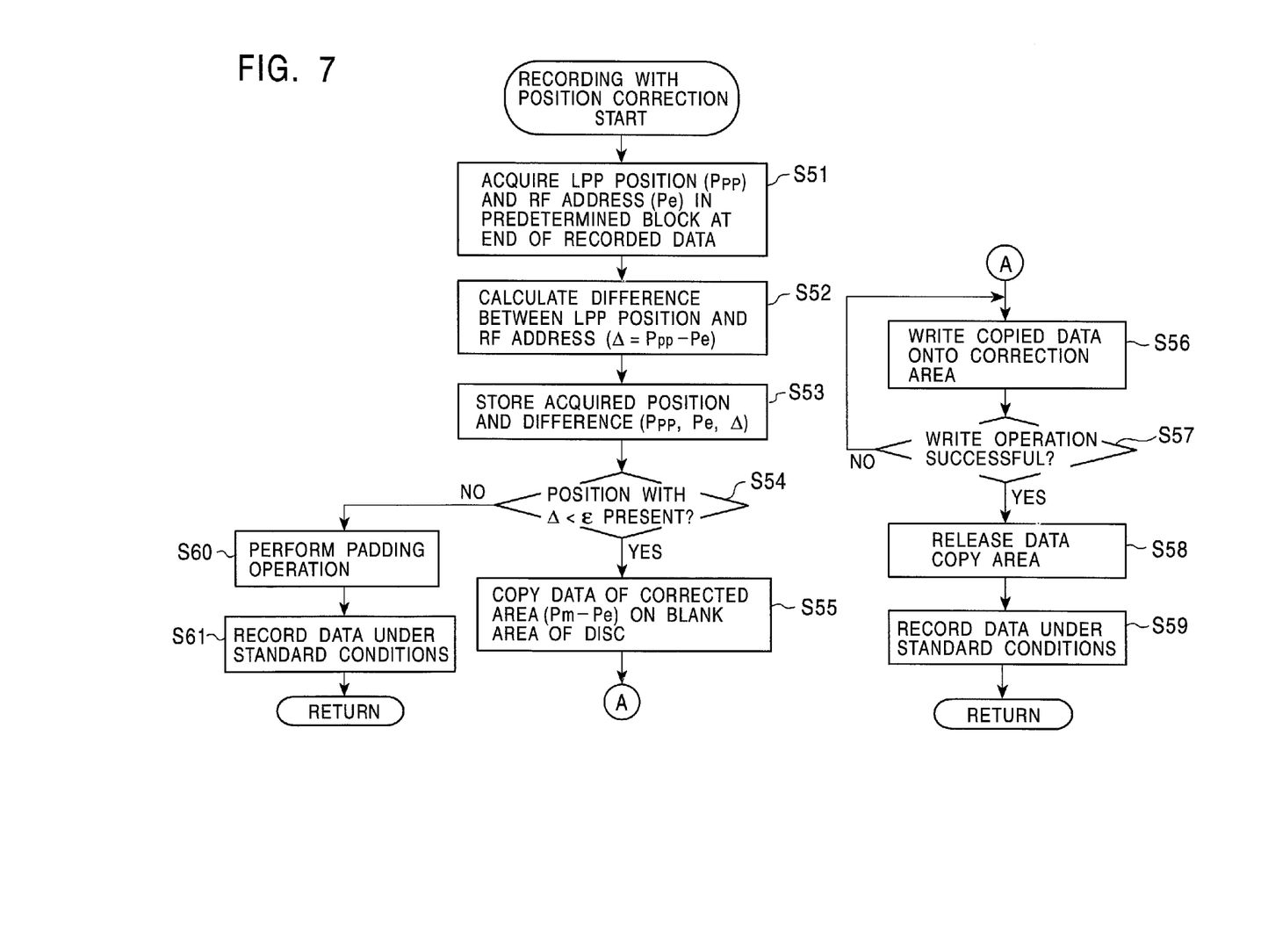
FIG. 7 is a flow diagram illustrating a recording operation procedure of the optical recording apparatus in accordance with a second embodiment of the present invention.

The recording operation procedure of an optical recording apparatus in accordance with a second embodiment of the present invention is described in detail below with reference to a flow diagram in FIG. 7 and a timing diagram in FIG. 8. The configuration of the optical recording apparatus 10 is similar to that of the first embodiment.

The recording operation in the re-recordable DVD-RW disc, corresponding to the position deviation correction and recording process in step S20 shown in FIG. 3, will now be described.

The CPU 27 acquires the LPP address and the RF address in a predetermined block of the end of the recorded data, for example, in the entire area of the previously recorded portion (step S51). The LPP address and the RF address are acquired at predetermined intervals, such as every position of the LPP. For simplicity of explanation, an LPP is present every frame. At the prepit position in each frame, the LPP address representing the prepit position and the RF address corresponding to that position are acquired. A difference $\Delta$ between each prepit position (Pp) and the corresponding RF address is calculated (step S52). The acquired position and the calculated difference $\Delta$ are stored (step S53).

The CPU 27 determines whether a prepit position (Pm) having the difference $\Delta$ with the RF address smaller than the predetermined value $\epsilon$ is contained in acquired data (step S54). When it is determined that the prepit position (Pm) is present in the data, the recorded data having a position deviation is corrected as shown in FIG. 8. Data of one encode unit containing correction areas (i.e., Pm–Pe) is copied to a blank area (step S55). After checking that the data has been successfully copied, the CPU 27 proceeds to step S56. When it is determined that the data has not been successfully copied, the CPU 27 performs a copying operation again. A portion of the copied data, intended for the correction area, is re-written onto the correction area so that the prepit position substantially agrees with the RF address (step S56), and thereby the data in the correction area is corrected. The CPU 27 reads the written data to determine whether the recorded data has been successfully corrected (step S57). When it is determined in step S57 that the recorded data has not been successfully corrected, the subroutine loops to step S56 to perform a write operation. When it is determined in step S57 that the recorded data has been successfully corrected, the area on which the data has been copied is released (step S58). The data is then recorded there under the standard conditions (step S59, mode F in FIG. 8).

Figure 8:
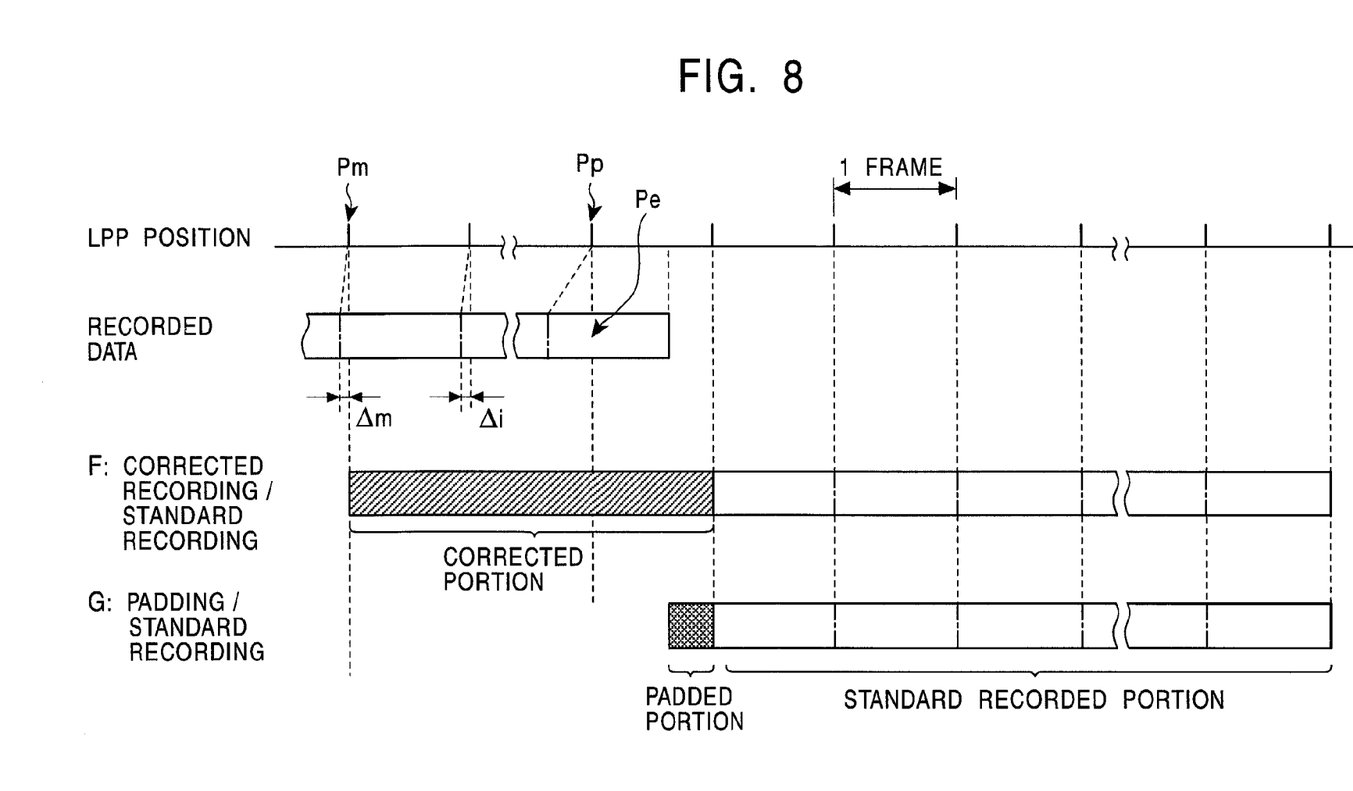
FIG. 8 illustrates the relationship of the positions of recorded data, prepit, and new data to be recorded in correction and recording modes of the optical recording apparatus of the second embodiment of the present invention.

When it is determined in step S54 that the difference $\Delta$ between each of all prepit positions and the corresponding RF address is equal to or greater than the predetermined value $\epsilon$, a padding operation is performed to the next prepit position (step S60), and the recording is then performed from the next prepit under the standard conditions (in a mode G in FIG. 8 in step S61).

In the above procedure, the position deviation of the recorded data is corrected so that the new data is recorded in a manner free from position deviation.

When the end of the recorded data suffers from a data fault due to any cause such as a power interruption, such abnormally recorded data becomes useless. New data may be overwritten on the abnormal data in whole or in part. For example, the data fault refers to the case in which the recording of data, which should be normally recorded by a predetermined unit of data, is actually suspended in the middle of the unit of data. The data fault may be detected by reading at least the data by one unit. To additionally record data in a disc with a finalizing instruction recorded thereon, the deviation may be left unresolved. Specifically, clock modulation is not performed, and data is recorded in succession to the end of the recorded data. When data is reproduced from the finalized disc, reproduction is based on the RF signal and the clock of the recorded signal in principle. Even if a difference is present in address between the RF signal and the prepit, the effect thereof is marginal. It is advantageous to assure consistency in the recording clock. This embodiment is applicable not only to a re-recordable disc such as a DVD-RW disc but also to a write-once DVD-R disc. Since an overwriting operation may not be performed on the write-once disc, the above method can be performed not only when the disc is finalized but also when a storage capacity remaining in the disc is small.

Third Embodiment

In each of the above-referenced embodiments, a difference is detected between the RF address and the LPP address, and recording control is performed based on the difference. Alternatively, recording control may be performed based on a difference between the sync signal and the prepit synchronization signal. As a general rule, the synchronization information SY of the sync frame is adjacent to the prepit B2 as the synchronization signal for the pre-information as already discussed. Based on the difference therebetween, the recording control is performed in the same manner as in the first and the second embodiments. The third embodiment is detailed below.

The recording control is performed based on the difference between the prepit position Pp and the RF address Pe in each of the first and second embodiments. In the third embodiment, the recording control is performed based on the difference between the prepit B2 and the synchronization signal SY. Two points should be taken into consideration. In the first and second embodiments, the prepit position Pp based on the prepit address is compared with the RF address Pe. Even if the deviation extends beyond one frame, the corresponding prepit position and the RF address Pe are precisely found and are used in the recording control. In the third embodiment, however, the recording control is performed based on the difference between the prepit B2 and the synchronization signal SY. If the deviation exceeds ±0.5 frame, it is difficult to correctly determine whether the prepit B2 and the synchronization signal SY correspond to each other. In this respect, the deviation typically falls within ±0.5 frame in the current recording apparatus such as the DVD-R disc or the DVD-RW disc. The prepit B2 and the synchronization signal SY adjacent thereto corresponds to each other. There is no inconvenience even if the correspondence between the prepit B2 and the synchronization signal SY is not verified. In the second point, the prepit B2 and the synchronization signal SY are present in the head portion of each frame, thereby, in a strict sense, failing to indicate a position deviation in the end portion of the recorded data from which additional data is recorded. However, in practice, the deviation is unlikely to sharply change within several frames in the disc recording. The deviation of the end portion of the recorded data to which data is added can be estimated by referencing the prepit B2 and the synchronization signal SY in the head portion of the recorded data. In the third embodiment, therefore, the similar recording control is performed with the prepit B2 and the synchronization signal SY respectively replacing the prepit position Pp and the RF address Pe in each of the first and second embodiment.

In accordance with a format for additional recording in the DVD-R disc and the DVD-RW disc, recording is suspended from the head of an ECC block to the middle of the second frame. In practice, the suspension is typically performed at a middle point close to the head of the second frame. In this case, the deviation of the end of the recorded data to which data recording is performed in succession can be estimated by referencing the deviation between the prepit B2 of the head of the second frame and the synchronization signal SY. In this arrangement, data comparison can be performed within a range far shorter than one frame. In this way, the recording control in the third embodiment may be performed using the deviation between the prepit B2 and the synchronization signal SY in the head of the frame in which the recording is suspended in the DVD-R and DVD-RW discs.

The third embodiment has a simple configuration without a counter, and allows the information data to be recorded with a little or no recording position deviation, thereby resulting in a recording apparatus of a high-performance optical recording medium.

Fourth Embodiment

In each of the above-referenced embodiments, the DVD-R and DVD-RW discs have LPP as the pre-information. Alternatively, the present invention is applicable to a recording medium in which the recording track may be wobbled (in a serpentine fashion) to indicate an absolute position on the disc. For example, such a recording medium has a recording track that wobbles at a constant frequency. The constant frequency is used to control a spindle motor that rotates an optical disc. The wobble has a varied phase. For example, two wobbled states of the recording track in opposite phases may respectively indicate "0" and "1", and an absolute position (a wobbling address) is represented by a combination of "0's" and "1's". In the fourth embodiment, the prepit Pp in the first and second embodiments is recognized based on the wobbling address, and is then converted into absolute information on the disc to perform the same recording control. The RF address to be compared with the wobbling address may be the one that is obtained from the RF signal read from the recorded data in the same way as in each of the first and second embodiments. In the fourth embodiment, the absolute address on the disc is the wobbling address. Another piece of information may be employed to represent an absolute position on the disc.

Each of the above-referenced embodiments uses signals (information), such as position information in recorded information being arranged at the same position as that of an absolute position on the disc, for example, the prepit position Pp and the RF address Pe. The present invention is applicable to a format in which position information in information recorded on the disc is shifted from an absolute position on the disc as long as the two pieces of information establish a predetermined relationship. The deviation therebetween on the disc may be calculated taking into account the relationship. The deviation from the predetermined relationship is thus determined. Based on the deviation, the recording control is performed. This arrangement also provides the same advantages as those of the above-referenced embodiments.

The detection methods for detecting the position deviation and the correction methods for correcting the position deviation, discussed in each of the above-referenced embodiments, may be appropriately modified or combined.

As described in detail, according to the present invention, there is provided a high performance recording apparatus in which recording can be performed in a deviation free manner or recording position deviation can be minimized.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Applications No. 2001-77723, No. 2002-20087 and No. 2002-66882 which are hereby incorporated by reference.

What is claimed is:

1. A recording apparatus for a write-once and/or re-recordable optical recording medium which has a recording position information section formed beforehand for bearing recording position information, and records a data signal including address information in accordance with recording frames indicated by said recording position information, the recording apparatus comprising:

a discriminator for discriminating said recording position information;

a detector for detecting a deviation between an end position address of recorded data already recorded on said optical recording medium and a frame address next to the end position address;

a controller for adjusting a recording start position of the data signal based on the deviation while recording the data signal; and an identifier for identifying a rewritable optical recording medium on which data is to be recorded, and an irregular-area detector for detecting an irregular record ing area which has the deviation, wherein the controller performs positional deviation correction of recording data by rewriting the data which has already recorded on the irregular recording area.

2. A recording apparatus according to claim 1, further comprising a memory for storing the data recorded onto the irregular recording area.

3. A recording apparatus according to claim 1, wherein said recording position information is information defined by a prepit.

4. A recording apparatus according to claim 1, wherein said recording position information is information defined by wobbling.

* * * * *